(12) United States Patent
Smith

(10) Patent No.: US 6,780,453 B1
(45) Date of Patent: Aug. 24, 2004

(54) DOUGH BAKING DEVICE AND METHOD

(76) Inventor: Anita L. Smith, 609 S. Sierra Ave., Oakdale, CA (US) 95361

( * ) Notice: Subject to any disclaimer, the term of this patent is extended or adjusted under 35 U.S.C. 154(b) by 232 days.

(21) Appl. No.: 09/972,110

(22) Filed: Oct. 4, 2001

(51) Int. Cl.[7] .................................................. A21D 8/00
(52) U.S. Cl. ...................... 426/523; 426/132; 426/391; 426/420
(58) Field of Search ................................. 426/523, 132, 426/391, 420, 501; 99/426, 428, 442

(56) References Cited

U.S. PATENT DOCUMENTS

| | | | |
|---|---|---|---|
| 1,589,850 A | * | 6/1926 | Haskell ........................ 426/138 |
| 2,627,825 A | * | 2/1953 | Stiles ............................. 426/501 |
| 3,290,154 A | | 12/1966 | Turner |
| 3,410,691 A | | 11/1968 | Stanley |
| 3,424,076 A | | 1/1969 | Bernatz |
| 3,604,342 A | | 9/1971 | Harding |
| 4,251,554 A | | 2/1981 | Baisden |
| 4,313,964 A | | 2/1982 | Dembecki |
| 4,915,964 A | | 4/1990 | Smietana |
| 4,929,458 A | | 5/1990 | Smietana |
| 5,000,084 A | | 3/1991 | Walliker |
| 5,009,902 A | | 4/1991 | Mercenari |
| 5,072,664 A | | 12/1991 | Tienor |
| 5,223,286 A | | 6/1993 | Selbak |
| 5,601,012 A | | 2/1997 | Ellner |
| 5,626,897 A | | 5/1997 | Goldstein |
| 5,662,030 A | | 9/1997 | Roecker |
| D388,236 S | | 12/1997 | Goldstein |
| 6,235,326 B1 | | 5/2001 | Kronenberger |

* cited by examiner

*Primary Examiner*—George C. Yeung
(74) *Attorney, Agent, or Firm*—Heisler & Associates

(57) ABSTRACT

A cylindrical mandrel is provided having a hollow core and a flare at one end. The cylindrical tube otherwise has a substantially constant diameter. Dough, such as phyllo dough, is wrapped around an outer surface of the mandrel in multiple layers. The dough and mandrel are then baked together until the dough hardens into a dough tube. The mandrel is then removed from the dough tube leaving the dough tube to be filled with an edible filling. The flare on the mandrel assists in removing the mandrel from the dough tube. The flare also facilitates contact between the mandrel and a baking tray to enhance heat transfer to an innermost layer of dough adjacent an outer surface of the mandrel. The hollow core of the mandrel facilitates baking of the innermost layer of dough adjacent the outer surface of the mandrel.

11 Claims, 2 Drawing Sheets

US 6,780,453 B1

DOUGH BAKING DEVICE AND METHOD

FIELD OF THE INVENTION

The following invention relates to molds and other structures to support pastry dough, phyllo dough and the like during baking. More particularly, this invention relates to substantially cylindrical mandrels which can have dough, and particularly phyllo dough, wrapped around an exterior surface to support the dough during baking and so that a rigid dough tube results after baking.

BACKGROUND OF THE INVENTION

Phyllo dough has long been known for use in baking. Phyllo dough is unique from other doughs in that it can be and often is rolled out to an exceptionally thin layer. For instance, phyllo dough is often 1/32 of an inch or less in thickness. Phyllo dough can be made from "scratch" or can often be purchased in stores already rolled out into this exceptionally thin layer. A variety of different dishes can then be baked utilizing this phyllo dough. Most typically, the phyllo dough is utilized in a series of adjacent horizontal layers above or below (or both) a topping/filling. The phyllo dough takes on a light crisp character after baking.

Many foods are known which desirably are provided in a cylindrical shape. Many of these food items include a pastry component. For instance, hot dogs or sausages can be baked with a dough outer wrapping to provide a substantially cylindrical pastry and meat food item. Other rolls, such as egg rolls, include a variety of different stuffing materials placed on a dough layer and the dough is rolled up around the stuffing and then baked, fried or otherwise cooked into a resulting cylindrical shape.

All such known prior art cylindrical food items require that the stuffing material be placed inside the outer cylindrical dough layer before cooking the dough along with the stuffing material. The stuffing and dough must be baked or otherwise cooked together is because the dough is too soft and flimsy to hold a cylindrical shape without the stuffing already located inside the dough. This requirement that the dough and stuffing be cooked simultaneously limits the variety of food items which can be made in a cylindrical shape with a dough exterior. For instance, if a cylindrical dough exterior is to be filled with a filling which cannot withstand the baking process, such as ice cream and other temperature sensitive fillings, or soft fillings which cannot effectively support the dough during baking, the desired food product cannot be successfully created.

Accordingly, a need exists for a device and technique which can allow dough such as phyllo dough to be baked into a cylindrical shape by itself so that other fillings which do not require baking can later be stuffed into the rigid shell resulting from baking of the dough into the cylindrical shape.

SUMMARY OF THE INVENTION

This invention provides a dough support mandrel and a dough preparation and baking method to allow dough such as phyllo dough to be baked into a rigid hollow cylindrical tube. The mandrel is preferably a substantially cylindrical hollow tube. Preferably, one end of the mandrel defines a plain edge with a diameter matching other portions of the mandrel. A second end of the mandrel preferably includes a flare with a tip having a diameter greater than a diameter of other portions of the mandrel.

The dough, such as phyllo dough is cut into sections which are narrower than a length of the mandrel. The dough is then rolled onto the mandrel with the dough at least partially overlapping itself and with the flare not covered by the dough. The mandrel and dough are then together placed on a baking tray, preferably along with other mandrels covered with other sections of dough. The flare of the mandrel is preferably in contact with the tray to enhance heat transfer between the tray and the mandrel. The mandrel is preferably hollow to enhance heat transfer to an inner layer of the dough, particularly when baking occurs in a convection oven.

After baking is complete, the exposed flare provides a convenient handle for grasping by a user separate from the dough and for easily sliding the mandrel out of the cylindrical shell of dough remaining. The remaining cylindrical shell of dough can then be stuffed with a variety of food items before serving.

OBJECTS OF THE INVENTION

Accordingly, a primary object of the present invention is to provide a structure to support dough, such as phyllo dough, in a cylindrical configuration so that the dough can be baked into a rigid cylindrical form.

Another object of the present invention is to provide a baking support structure which encourages heat transfer to an innermost layer of dough abutting the support structure.

Another object of the present invention is to provide a baking support structure which is cylindrical in form so that dough can be baked into a hollow cylindrical shape.

Another object of the present invention is to provide a baking support structure which can be readily removed from dough baked thereon.

Another object of the present invention is to provide a method for baking dough, and particularly phyllo dough, into a hollow cylindrical tube shape.

Another object of the present invention is to provide a method for making food items including a cylindrical outer pastry shell and an inner filling with the inner filling not having to be baked.

Other further objects of the present invention will become apparent from a careful reading of the included drawing figures, the claims and detailed description of the invention.

DESCRIPTION OF THE PREFERRED EMBODIMENT

Figure 1:
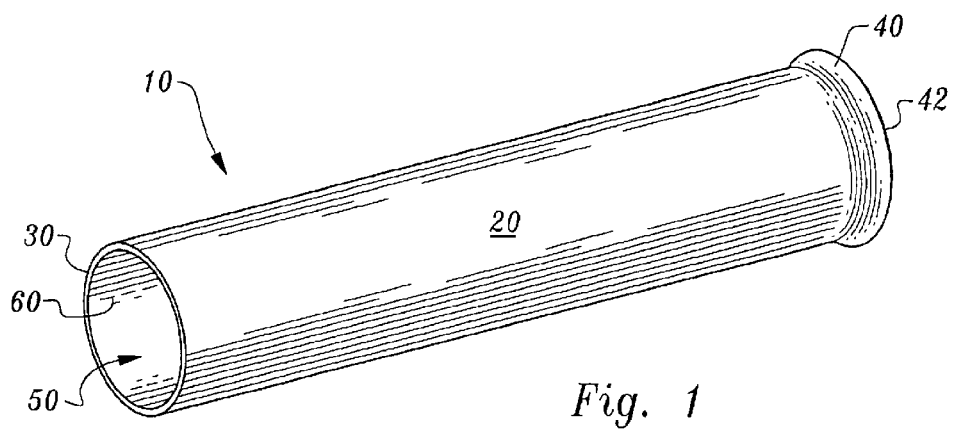
FIG. 1 is a perspective view of the mandrel of this invention before any dough has been placed thereon.

Referring to the drawings, wherein like reference numerals represent like parts throughout the various drawing figures, reference numeral 10 (FIG. 1) is directed to a mandrel for use in practicing the method of this invention and for providing the mold of this invention. While the mandrel 10 is shown alone, it would typically be utilized as one in a set of multiple mandrels 10 to form dough tubes 100 of baked dough 70 (FIGS. 3–6).

Figure 2:
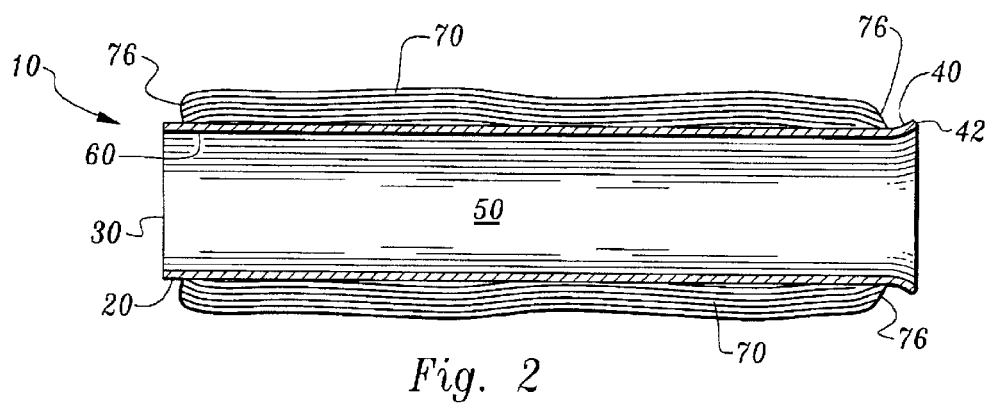
FIG. 2 is a front elevation full sectional view of the mandrel shown in FIG. 1 with multiple layers of dough wrapped around an outer surface of the mandrel.
Figure 3:
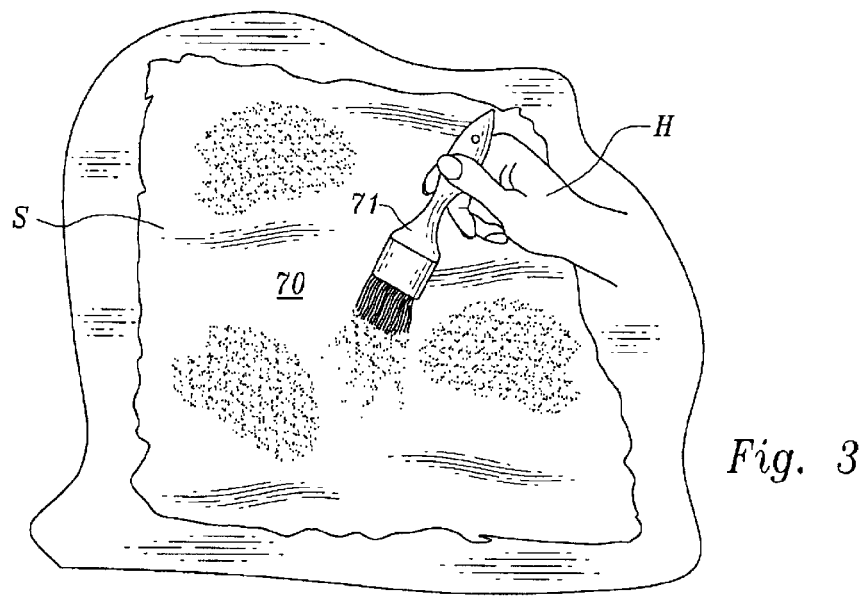
FIG. 3 depicts an early preparation step for dough before wrapping the dough onto the mandrel.
Figure 4:
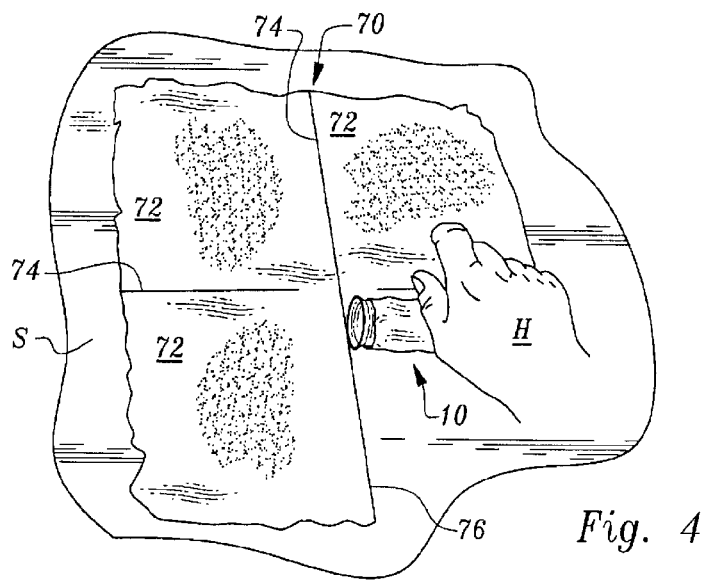
FIG. 4 is a depiction of a thin layer of dough, such as phyllo dough, being rolled up onto the mandrel according to this invention.

In essence, and with particular reference to FIGS. 1 and 2, basic features of the mandrel 10 and method of this invention are described. The mandrel 10 is preferably a hollow cylindrical tube of aluminum having a substantially constant diameter. A plain edge 30 preferably has a diameter similar to that of other portions of the mandrel 10. A flare 40 is provided opposite the plain edge 30. The flare 40 has a diameter at a tip 42 of the flare 40 which is greater than other portions of the mandrel 10. A hollow core 50 passes through an interior of the mandrel 10. Multiple layers of dough 70 are wrapped around the outer surface 20 of the mandrel 10 for baking the dough 70 (FIG. 4) into a dough tube 100 (FIG. 6) which is hardened and ready for stuffing with other food items.

More particularly, and with particular reference to FIGS. 1 and 2, specific details of the mandrel 10 are described. The mandrel 10 is preferably formed of a cylindrical tube of an aluminum alloy suitable for direct contact with food. This tube preferably has a diameter of 1¼ inches and a length of 6 inches with a wall thickness between an outer surface 20 and an inner surface 60 of about ⅛ of an inch. The mandrel 10 could alternatively be a solid construct with no hollow core 50 or only a partial hollow core. Also, the mandrel 10 could be formed from other metals or from non-metals. While the plain edge 30 preferably has a diameter similar to other portions of the mandrel 10, the plain edge 30 could have a lesser diameter than other portions of the mandrel 10 and still allow the mandrel 10 to function effectively.

The outer surface 20 is preferably cylindrical and has a substantially constant diameter. This outer surface 20 comes into direct contact with the dough 70 and supports the dough 70 to form the dough 70 into the dough tube 100 (FIG. 6) of this invention during baking.

The flare 40 of the mandrel 10 preferably curves away from a central axis of the mandrel 10 at approximately a 40° angle adjacent the tip 42. The tip 42 of the flare 40 preferably has a diameter of 1½ inches. The flare 40 could have a variety of different configurations including a stepped configuration or an abrupt annular configuration or an irregular non-radially symmetrical configuration about a central axis of the mandrel 10. Preferably, the flare 40 is limited to 10% or less of the length of the mandrel 10, with 5% or less most preferred as best shown in FIG. 2.

The flare 40 provides two main benefits to the mandrel 10. First, the flare 40 defines a region which is not to be covered by the dough 70 and which can be easily grasped by hands H of a user (typically with a towel 90 if the mandrel 10 is still hot) so that the mandrel 10 can be removed from the dough tube 100 after baking (FIG. 6). Second, the flare 40 can extend sufficiently radially away from a central axis of the mandrel 10 so that the tip 42 of the flare 40 comes into contact with the tray 80 when sufficiently thin dough 70 or a small enough number of layers of dough 70 are placed upon the outer surface 20 of the mandrel 10. When the tip 42 of the flare 40 is in contact with the tray 80 (such as at the contact point 82 of FIG. 5) the mandrel 10 can be heated by conduction heat transfer between the tray 80 and the mandrel 10 to enhance heat transfer into an innermost layer of the dough 70 so that the dough 70 more effectively both cooks from the outside in and from the inside out.

Figure 5:
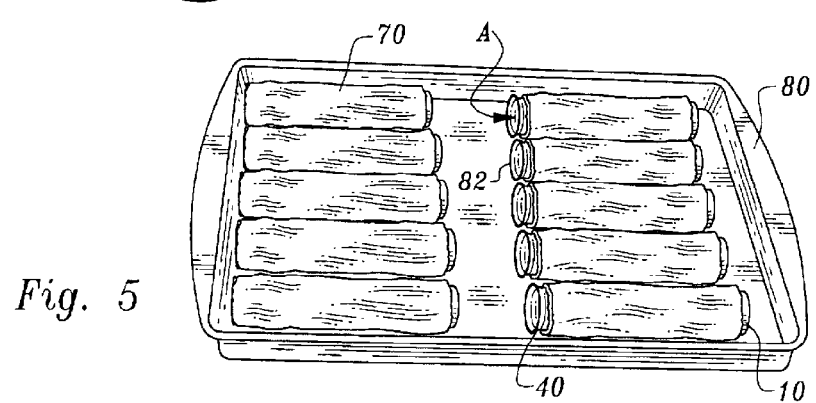
FIG. 5 is a perspective view of a tray and multiple mandrels with dough wrapped thereon and ready for baking.
Figure 6:
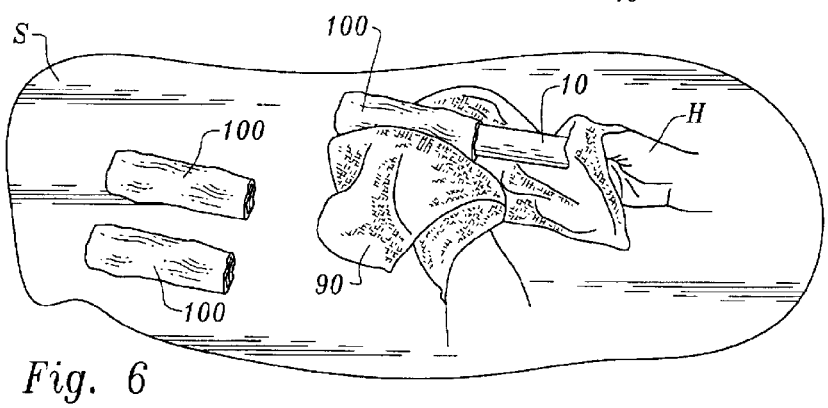
FIG. 6 is a perspective view illustrating how the mandrel is removed from the tubular dough shell after baking.

The hollow core 50 preferably is oriented horizontally when the mandrel 10 is used for baking the dough 70 (FIG. 5). If the dough 70 is baked in a convection oven, air flow (along arrow A of FIG. 5) can be enhanced through the hollow core 50 to further enhance baking of an innermost layer of the dough 70 adjacent the outer surface 20 of the mandrel 10. While not preferred, the dough 70 can be effectively baked on a mandrel 10 which does not include a hollow core 50.

Typically, the flare 40 of the mandrel 10 is provided merely by a reaming type operation where a conically tapering structure with a hardness and strength greater than the aluminum tube forming the mandrel 10 and having a diameter greater than 1¼ inches is forced into one end of the mandrel 10 with sufficient force to form the flare 40.

If desired, the mandrel 10 can be coated, such as with a Teflon coating and can be formed from materials other than aluminum, including cast iron, steel, ceramic materials and any other materials which are known or become known in the future for use in baking. While the length and diameters of the mandrel 10 are described above for a preferred form of this invention, the diameters and lengths of the mandrel 10 and thickness of the wall between the outer surface 20 and the inner surface 60 can all be adjusted to meet particular design parameters specified by a user and still be within the scope of this invention.

In use and operation, the invention is practiced as follows. Initially, at least one layer of dough, such as phyllo dough, is laid out on a surface S. Preferably, the dough has already been rolled out to an exceptionally thin layer (i.e. less than ¹⁄₁₆ of an inch and preferably less than ¹⁄₃₂ of an inch). Preferably, the dough 70 is basted with a brush 71, such as with butter or some other basting or stick resisting agents. Other such agents include margarine, vegetable shortening, water or animal fat. The dough 70 is then cut into quadrants 72 through use of cut lines 74, such as could be made with a pizza cutter or knife.

A user then takes a mandrel 10 and sets it upon one of the quadrants 72 of dough 70. The mandrel 10 is then rolled along the dough 70 with the dough 70 kept adjacent the outer surface 20 of the mandrel 10. The mandrel 10 continues to roll until the entire quadrant 72 of dough 70 has been rolled up onto the outer surface 20 of the mandrel 10. Typically, the dough 70 will overlap itself at least partially and preferably forms at least two layers over the entire outer surface 20 of the mandrel 10. In many cases four or more layers of dough can be placed on the outer surface 20 of the mandrel 10 and still have the flare 40 capable of contacting the tray 80 during baking.

Preferably, the quadrants 72 of dough 70 are formed of a width slightly less than a length of the mandrel 10. In this way, the dough 70 is kept from overlapping the flare 40. If a user desires to have one end of the dough 70 closed, the dough 70 can be rolled in a manner overlapping the plain edge 30 somewhat. After rolling is complete, the portions of the dough 70 extending beyond the plain edge 30 of the mandrel 10 can be tucked into the hollow core 50 adjacent the plain edge 30 so that once baked, a closed end cylinder has been created. Edges 76 of the dough 70 are preferably aligned with each other and are inboard of the plain edge 30 and the flare 40 unless a closed end tube pastry is desired as described above.

The above steps are repeated with other quadrants 72 and other mandrels 10 until a desired number of dough tubes 100 (FIGS. 5 and 6) have been placed onto mandrels 10. The mandrels 10 are all placed on a tray 80, preferably with the flare 40 of each mandrel 10 in contact with the tray 80.

The tray 80, mandrels 10 and dough 70 are then all placed in an oven for baking. Preferably, baking occurs at 400° F. until the dough 70 has taken on a golden brown appearance (typically approximately 20–25 minutes). While less desirable, the invention could be practiced by baking at 350° or less for as little as 15 minutes or less, provided the tube 100 has sufficient hardness to not collapse under its own weight.

Finally, the flare 40 of the mandrel 10 is grasped by a hand H of a user, typically through a towel 90 or other low heat conducting layer to pull the mandrel 10 out of the remaining dough tube 100. Preferably, the mandrel 10 is removed while the dough tube 100 is still hot for maximum effectiveness in removing the mandrel 10. Finally, the dough tube 100 can be filled with any desired filing.

This filling procedure can occur while the dough is still warm or after the dough has cooled. Typically, the filling either does not require cooking or has already been cooked. Hence, the tube 100 and filling combination are ready to be served after the tube 100 has been filled. Alternatively, the tube 100 could be backed further along with the filling. If desired, a topping can also be placed on an exterior of the tube 100. If desired, unused tubes 100 can be preserved for later use by freezing or other preservation techniques.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for baking phyllo dough into a stuffable pastry tube, including the steps of:
   providing a cylindrical mandrel having a substantially constant diameter along a majority of a length of the cylindrical mandrel;
   rolling a phyllo dough sheet onto the cylindrical mandrel so that the phyllo dough at least partially overlaps itself;
   baking the phyllo dough and the mandrel at sufficient temperature and for sufficient duration of time to allow the phyllo dough to harden;
   removing the cylindrical mandrel from the phyllo dough to form the stuffable pastry tube; and
   wherein said providing step includes having the cylindrical mandrel include a flare at one end of the cylindrical mandrel, the flare defining a greatest diameter portion of the cylindrical mandrel.

2. The method of claim 1 wherein said rolling step includes rolling the phyllo dough a sufficient number of times about the cylindrical mandrel so that at least two layers of phyllo dough overlap over all portions of the cylindrical mandrel which are covered by the phyllo dough.

3. The method of claim 1, wherein said providing step includes providing the cylindrical mandrel with a hollow core.

4. The method of claim 1 wherein said rolling step is preceded by the step of cutting the phyllo dough into a sheet having a width less than a length of the cylindrical mandrel.

5. A method for baking phyllo dough into a stuffable pastry tube, including the steps of:
   providing a cylindrical mandrel having a substantially constant diameter along a majority of a length of the cylindrical mandrel;
   rolling a phyllo dough sheet onto the cylindrical mandrel so that the phyllo dough at least partially overlaps itself;
   baking the phyllo dough and the mandrel at sufficient temperature and for sufficient duration of time to allow the phyllo dough to harden;
   removing the cylindrical mandrel from the phyllo dough to form the stuffable pastry tube;
   wherein said rolling step is preceded by the step of cutting the phyllo dough into a sheet having a width less than a length of the cylindrical mandrel;
   wherein said providing step includes having the cylindrical mandrel include a flare at one end of the cylindrical mandrel, the flare defining a greatest diameter portion of the cylindrical mandrel.

6. The method of claim 1 wherein said rolling step includes the step of leaving the flare of the cylindrical mandrel exposed.

7. The method of claim 1 wherein said baking step includes the step of placing the cylindrical mandrel and the phyllo dough on the cylindrical mandrel onto a tray with a central axis of the cylindrical mandrel substantially parallel to a surface of the tray and with the flare of the cylindrical mandrel touching the tray.

8. The method of claim 7 wherein said baking step includes baking the phyllo dough and the mandrel at a temperature of at least 350° F. for at least fifteen minutes.

9. The method of claim 1 wherein said rolling step is preceded by the step of basting the phyllo dough with a stick resisting grease selected from the group consisting of: products including butter, products including margarine, products including vegetable shortening, and products including animal fat.

10. A method for baking phyllo dough into a stuffable pastry tube, including the steps of:
    providing a cylindrical mandrel having a substantially constant diameter along a majority of a length of the cylindrical mandrel, the cylindrical mandrel including a flare at one end of the cylindrical mandrel, the flare defining a greatest diameter portion of the cylindrical mandrel;
    rolling a phyllo dough sheet onto the cylindrical mandrel so that the phyllo dough at least partially overlaps itself;
    baking the phyllo dough and the mandrel at sufficient temperature and for sufficient duration of time to allow the phyllo dough to harden; and
    removing the cylindrical mandrel from the phyllo dough to form the stuffable pastry tube.

11. A method for baking dough into a stuffable pastry tube, including the steps of:
    providing a cylindrical mandrel having a substantially constant diameter along a majority of a length of the cylindrical mandrel, the cylindrical mandrel including a flare at one end of the cylindrical mandrel, the flare defining a greatest diameter portion of the cylindrical mandrel;
    rolling a dough sheet onto the cylindrical mandrel so that the dough at least partially overlaps itself;
    baking the dough and the mandrel at sufficient temperature and for sufficient duration of time to allow the dough to harden; and
    removing the cylindrical mandrel from the dough to form the stuffable pastry tube.

* * * * *